Dec. 2, 1941.　　　O. H. VAN HOOSER　　　2,264,922
DRILLING TOOL
Filed May 22, 1941

Inventor
Oscar H. Van Hooser,
By McMorrow & Berman
Attorneys

Patented Dec. 2, 1941

2,264,922

UNITED STATES PATENT OFFICE 2,264,922

DRILLING TOOL

Oscar H. Van Hooser, Memphis, Tenn.

Application May 22, 1941, Serial No. 394,710

3 Claims. (Cl. 77—65)

My invention relates to drilling tools and has as one of the principal objects thereof the provision of a drilling tool so constructed and arranged whereby the edges of a face defining a hole or opening formed in a work-piece by the tool may be countersunk or rounded by the tool and thus eliminate the employment of other tools for performing the last mentioned operation.

Another object of my invention is to provide a tool of the above described character so constructed and arranged whereby the edges of the face may be selectively treated.

An important object of my invention is to provide a device of the character described which is simple in construction, durable in use, efficient in operation and economical in manufacture.

With the above and other objects in view, as will hereinafter appear, the invention consists in the combination, and arrangement of parts hereinafter set forth and illustrated in the accompanying drawing, from which the several features of the invention and the advantages attained thereby will be readily understood by those skilled in the art.

Referring to the drawing wherein like reference characters designate like parts throughout the several views.

Figure 1:
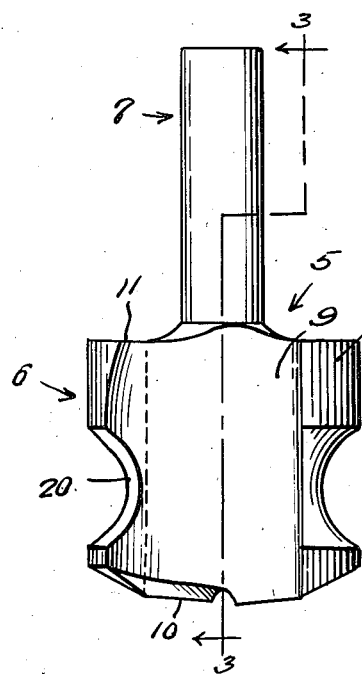
Figure 1 is a side elevation of a tool constructed in accordance with my invention.
Figure 2:
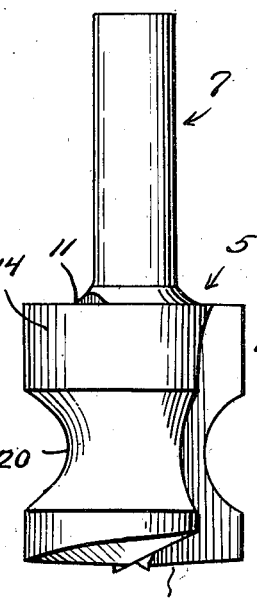
Figure 2 is a view similar to Figure 1 with the tool viewed from a different position.
Figure 3:
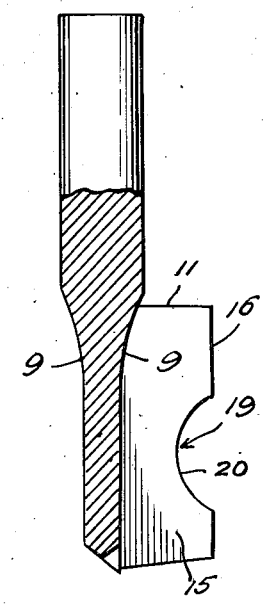
Figure 3 is a sectional view taken on the line 3—3 of Figure 1.
Figure 4:
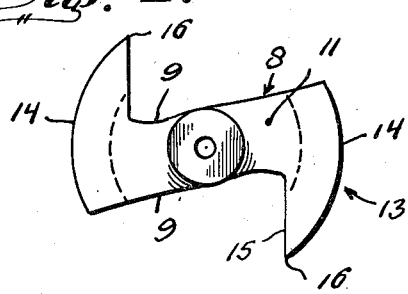
Figure 4 is a top plan view.
Figure 5:
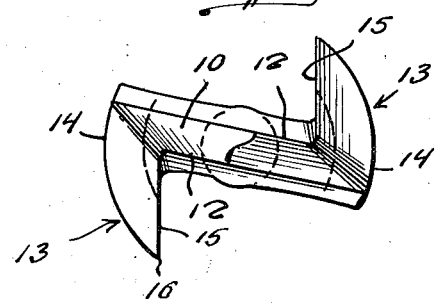
Figure 5 is a bottom plan view.

As illustrated in the drawing, I employ a drilling tool in the form of a router bit 5 and which comprises a work-head 6 and a shank 7 adapted to be connected within a chuck (not shown) for rotating the bit. The head 6 is of a one-piece construction formed with an elongated and relatively narrow body portion 8, the latter having its side faces 9 diverging towards the shank 7. The faces 9 are marginated by cutter and shank faces 10 and 11 respectively and with the shank face 11 being structurally integrally formed with the shank 7 and of a greater width than the cutter face 10. Said cutter face 10 is fashioned with a pair of facets disposed in oppositely extending and angularly related transverse planes whereby opposite edges of said facets constitute cutting edges 12. The ends of the body portion are each fashioned with a laterally extending projection or cutting tooth 13 having an outer arcuate face 14 defined by an arc generated on an axis coincident with the axis of the shank and with an inner plane face 15 angularly related to the adjacent face 9 of the body portion and coacting with the arcuate face 14, at coincident ends, to define a cutting edge 16.

Figure 6:
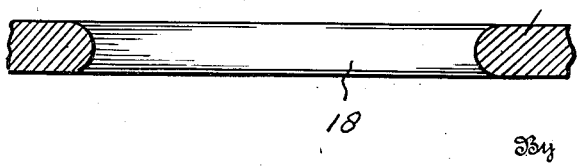
Figure 6 is a sectional view of a work-piece having an opening formed therein by my novel tool.

The foregoing is descriptive of a router bit of an ordinary construction for drilling holes of uniform diameters. In practising my invention, while I utilize a tool of the above described character, I so modify said tool in a manner whereby the edges of a face defining a hole or opening formed in the work-piece by the tool may be countersunk, rounded or dressed, an example of the same being illustrated in Figure 6 of the drawing wherein the work-piece 17 is formed with an opening 18 and with the edges of the face defining said opening being rounded or countersunk. To accomplish the foregoing and other desirable results, I modify or form each arcuate face 14, interjacent said cutter and shank faces 10 and 11 with a circumferential groove 19 defined by an arcuate surface coacting with the plane face 15, adjacent the cutting edge 16, to define an arciform cutting edge 20 whereby when the hole is drilled in the work-piece 17, by the edges 12 and 16, and with the work-piece disposed about the head, lateral rotative shifting of the work-piece about the tool will effect engagement of the cutting edges 20 with the face defining the hole 18 and thus countersink, round or dress the edges of said last mentioned face as illustrated in Figure 6. Furthermore, by maintaining the work-piece in engagement with the tool during said dressing the diameter of the hole may be increased to a desired size. By effecting relative vertical shifting of the work-piece and tool, the edges defining the hole may be selectively treated.

While I have disclosed my invention in connection with a router bit, it is to be understood that my tool may take the forms of other bits or drills constructed in a manner to perform the foregoing described operations.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. A tool of the class described, comprising, a work-head, a shank adjacent said head for rotating said head, said head being of a one-piece construction and formed with an elongated and relatively narrow body portion having side faces, said body provided with cutter and shank faces marginating said side faces and with the shank face being structurally integrally connected to said shank, said outer face being fashioned with a pair of angularly related facets coacting with said side faces to define cutting edges, said body portion provided with ends each fashioned with a laterally extending cutting tooth having an outer arcuate face and an inner plane face angularly related to the adjacent side face and coacting with the arcuate face to define a cutting edge, each arcuate face, interjacent said cutter and shank faces, being formed with a circumferential groove and with the surface defining said groove coacting with said plane face, adjacent said last mentioned cutting edge, to define an arciform cutting edge for dressing the edges of a face defining a hole drilled in a work-piece by said first and second defined cutting edges when said work-piece is laterally shifted into and about said grooves.

2. A tool of the class described, comprising, a body formed with a plurality of circumferentially disposed cutting edges for drilling a hole in the work-piece, said cutting edges being formed with incurvations defining cutting edges for dressing the edges of a face defining a hole formed in said work-piece by said first mentioned cutting edges.

3. A tool of the class described, comprising, a body formed with a plurality of circumferentially disposed cutting teeth having arcuate faces terminating at one side in cutting edges, said faces being each formed with a circumferentially extending incurvated section, said sections terminating, adjacent said cutting edges, in cutting edges for dressing the edges of a face defining a hole formed in a work-piece by said first mentioned cutting edges when said work-piece is laterally shifted into and about said sections.

OSCAR H. VAN HOOSER.